R. A. McVITTY.
PROCESS OF MAKING FERTILIZER.
APPLICATION FILED MAY 9, 1908.
950,455.
Patented Feb. 22, 1910.
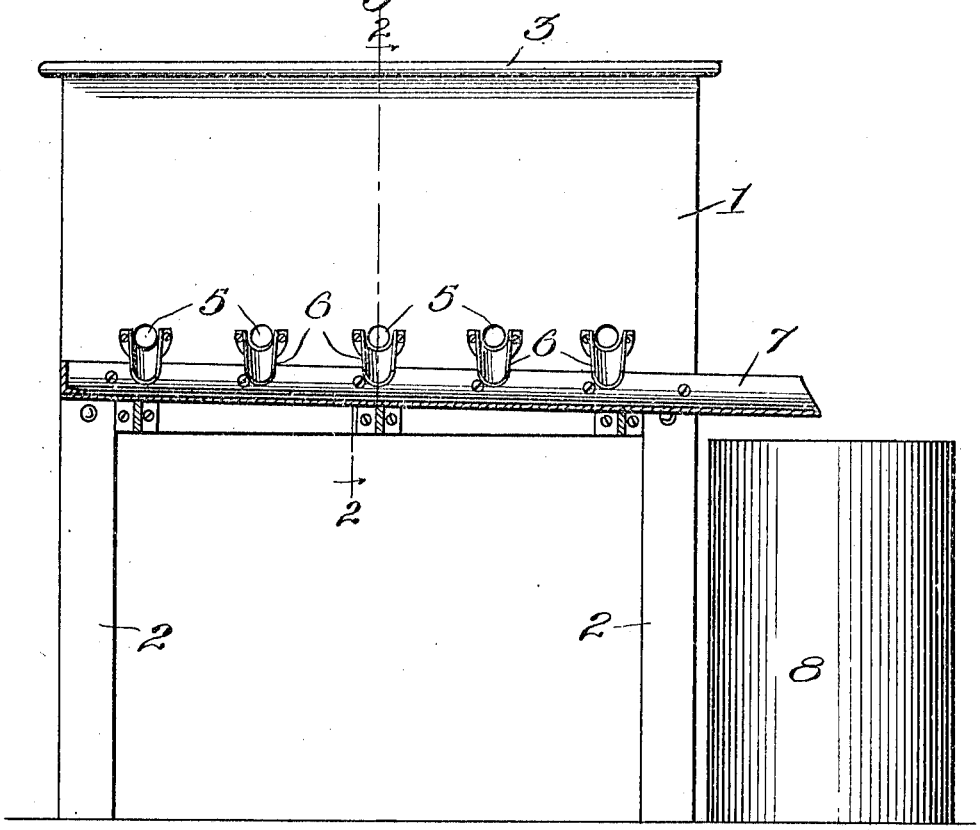
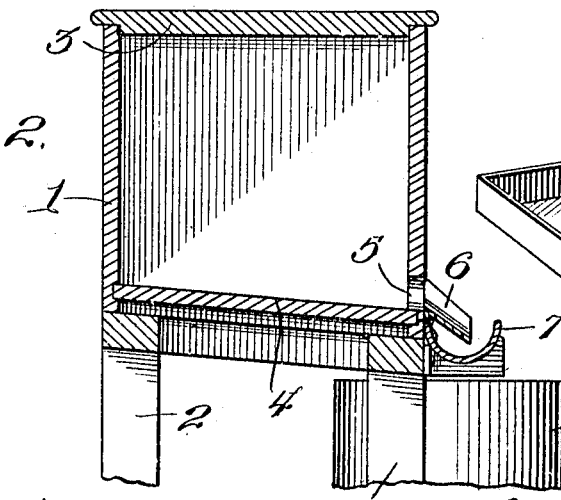
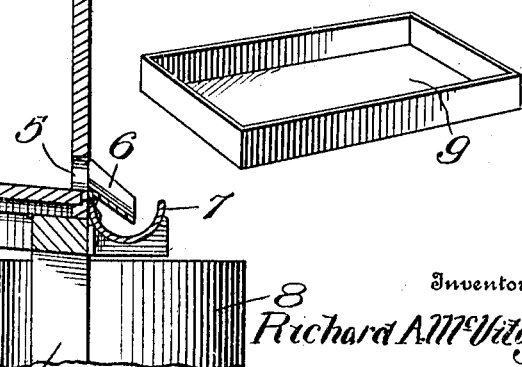
Witnesses
J. L. Wright
P. M. Smith
Inventor
Richard A. McVitty,
By Victor J. Evans,
Attorney

UNITED STATES PATENT OFFICE.

RICHARD A. McVITTY, OF MULLAN, IDAHO.

PROCESS OF MAKING FERTILIZER.

950,455.  Specification of Letters Patent.  Patented Feb. 22, 1910.

Application filed May 9, 1908. Serial No. 431,809.

*To all whom it may concern:*

Be it known that I, RICHARD A. McVITTY, a citizen of the United States, residing at Mullan, in the county of Shoshone and State of Idaho, have invented new and useful Improvements in Processes of Making Fertilizer, of which the following is a specification.

This invention relates to process of treating sea weed, the object of the invention being to render sea weed useful as a fertilizing agent, the sea weed when properly treated being rich in potash and admirably adapted for the purpose specified.

With the above general object in view, the invention consists in the novel features and details of construction hereinafter described, illustrated and claimed.

In the accompanying drawings:—Figure 1 is a view in elevation partly in section of the apparatus by which the process is carried out. Fig. 2 is a vertical cross section through the same on the line 2—2 of Fig. 1. Fig. 3 is a detail perspective view of one of the evaporating pans.

Referring to the drawings, 1 designates a container in which the sea weed is placed just as it is gathered from the sea or the beach along which it is strewn. The container 1 is preferably mounted upon supporting legs 2 and may be provided with a cover 3 which closes the top of the container.

The container embodies an inclined bottom 4 and is provided at the lowermost point adjacent to said bottom with a series of holes or perforations 5 for the escape of the contents of the container, spouts 6 leading from the openings 5 outward so as to deposit the material in a trough 7 which extends along the side of the container and is inclined downward toward its discharge end which projects as shown in Fig. 1 so as to admit a receiver such as a barrel indicated at 8 to be placed along the trough.

9 designates an evaporating pan in which the liquid or partly liquid contents of the container may finally be deposited to evaporate the moisture from the material and render the same dry.

The sea weed is gathered and placed in the container 1 and then allowed to ferment until thoroughly decomposed and converted into a liquid. If desired, the decomposition of the sea weed may be effected by subjecting the contents of the container to heat which may be applied in any convenient way as by running steam pipes through the container or making the container of metal and building a fire beneath the same. When decomposition sets in, the sea weed is rendered liquid or semiliquid so that it will flow out through the holes 5 into the trough 7 and be discharged into the receiver 8. The material may then be poured into evaporating pans one of which is shown at 9 and allowed to stand until the moisture evaporates from the product, leaving the latter in a dry state. This dry substance may then, if desired, be reduced to powdered form by any suitable milling process.

The process hereinabove described does not impair the quality of the sea weed as a fertilizing agent and enables the potash in the sea weed to be retained thereby rendering the material very valuable as a fertilizing agent. The sea-weed used is that found in quantities along the Pacific coast and generally known as kelp.

I claim:—

1. The process of preparing a fertilizer from sea-weed in its crude state, which consists in fermenting the sea-weed while confined until decomposition thereof is effected and a liquid mass produced, then removing the moisture from the liquid mass by evaporation and finally reducing the resultant mass to powdered form.

2. The process of preparing a fertilizer from sea-weed in its crude state, which consists in fermenting the sea-weed while confined until decomposition thereof is effected and a liquid mass produced and subjecting the mass while confined to heat during the period of fermentation and decomposition to promote dissolution of the mass, then removing the moisture from the liquid mass by evaporation and finally reducing the resultant mass to powdered form.

In testimony whereof I affix my signature in presence of two witnesses.

RICHARD A. McVITTY.

Witnesses:
  GEO. A. KAIN,
  JOHN LUCAS.